Nov. 21, 1967    P. W. STRIPP    3,353,341
AIR FILTERS FOR INTERNAL COMBUSTION ENGINES
Original Filed May 7, 1964    3 Sheets-Sheet 3
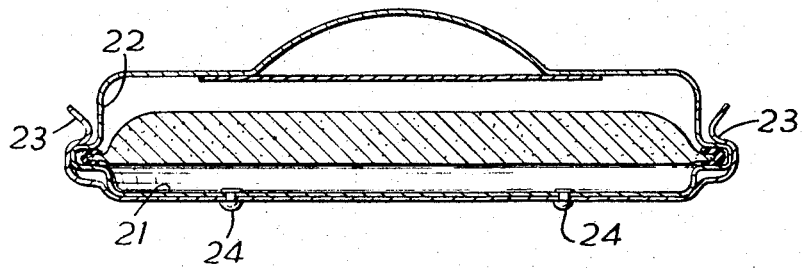
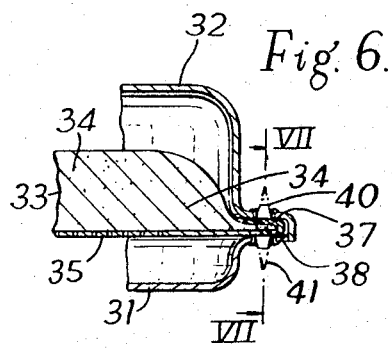
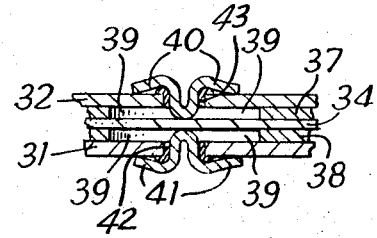
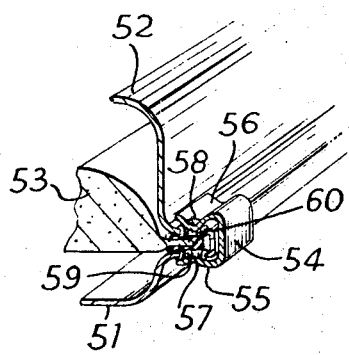
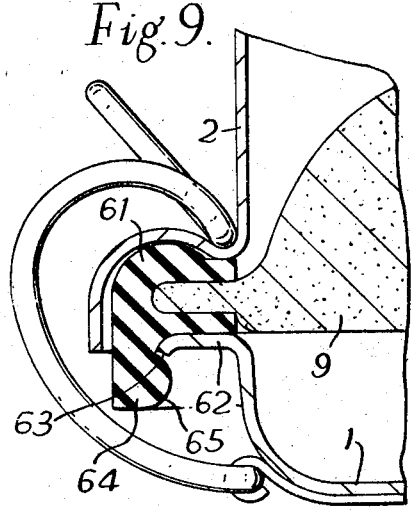
INVENTOR:
PETER WILLIAM STRIPP,
BY
Mason, Kolehmainen, Rathburn & Wyss,
ATTORNEYS.

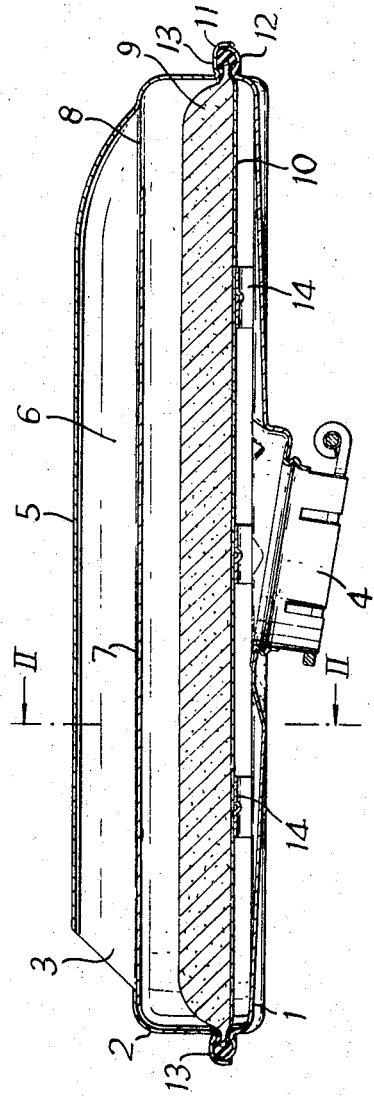

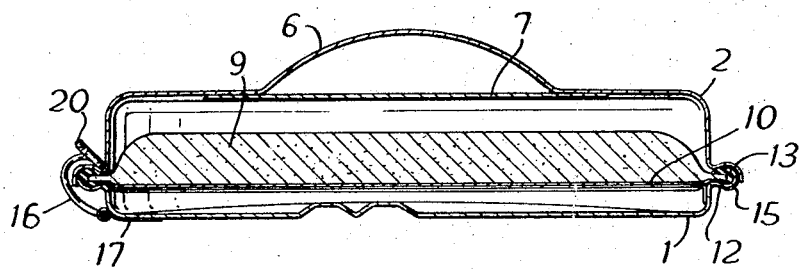
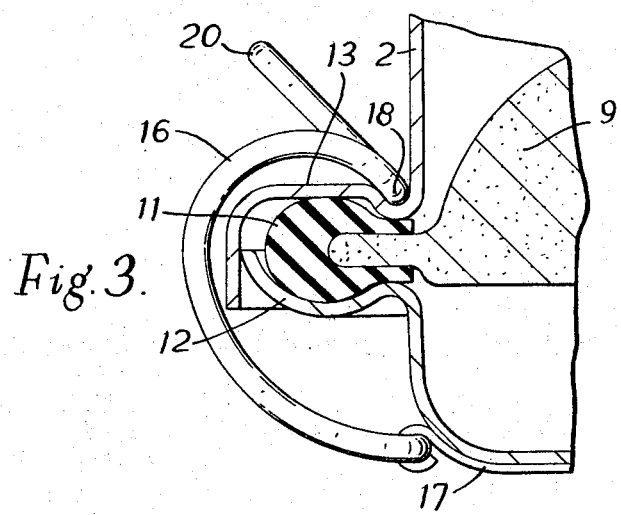
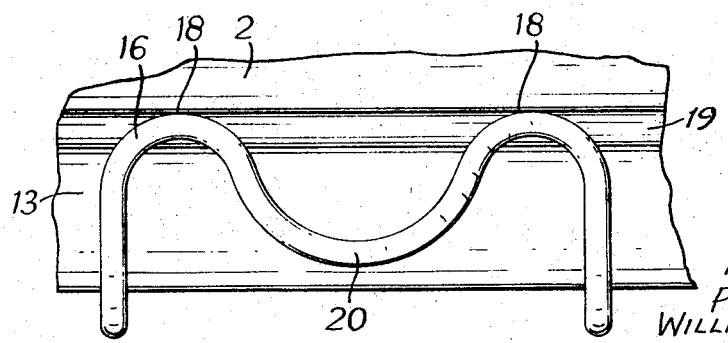

United States Patent Office 3,353,341
Patented Nov. 21, 1967

3,353,341
AIR FILTERS FOR INTERNAL COMBUSTION ENGINES
Peter William Stripp, Plymouth, Devon, England, assignor to Tecalemit (Engineering) Limited, Devon, England
Continuation of application Ser. No. 365,696, May 7, 1964. This application Mar. 29, 1966, Ser. No. 542,993
Claims priority, application Great Britain, May 10, 1963, 18,590/63
1 Claim. (Cl. 55—502)

ABSTRACT OF THE DISCLOSURE

There is provided an air filter for an internal combustion engine or similar device having a generally flat filter element with a thin peripheral projection and provided with a bead secured to the projection. The bead of the filter element is clamped between the body of the filter and the cover thereof. Preferably the bead has a downwardly turned flange having an inwardly projecting lip which engages around and beneath a lip in the filter body which serves not only to position the filter element over the body, but additionally to hold the filter element tight during removal and replacement of the cover.

---

This application is a continuation of my copending application Ser. No. 365,696, filed May 7, 1964, and now abandoned.

This invention relates to fluid filters and more particularly to air filters for use with internal combustion engines.

When designing air filters for internal combustion engines, particularly those used on motor vehicles, a number of considerations have to be taken into account, including the space available. With the present designs of vehicle bodies and the arrangement of the engines therein it is often required to keep the height of the engine and of its accessories down to a minimum. It is one of the objects of the present invention to provide an improved filter having a casing the height of which can be kept to a very low value, while at the same time, providing an adequate filtration area.

A further object of the invention is to provide improvements in the construction of the casing of such a filter, in the mounting of a filter element or elements within it and in securing the cover of the casing in position.

A more particular object of the invention is to provide an improved form of seal between the edges of the filter element and the casing, which offers a number of advantages over previously known forms of such seal.

The filter element used in the filter of the invention is advantageously formed of at least one layer of a material formed of an intermingled mass of fibres, for which purpose it is preferred to use a copolymer of a vinyl chloride with an acrylonitrile.

It is preferred that the body and cover should be of extended flattened form, such that the depth of the filter casing is substantially less than its length and preferably also than its width. It is also preferred that the body part and cover of the filter casing should be made of a resin bonded fibrous material, instead of the usual sheet metal. With such materials the casing can be made light in weight and strong, while the production and transmission of noise in or by the filter casing can be considerably reduced.

The body part and cover of the casing are preferably secured together by means of a number of connections spaced along their engaging edges. Some of these connections may be provided by a lip or by lugs fixed to one of the casing parts along one of the edges of the latter, the remainder of the connections being provided by one or more releasable clips or fastenings arranged along another edge or edges of the casing.

Further features of the invention will become apparent from the following description of certain preferred embodiment thereof. Reference will be made to the accompanying drawings, in which:

FIGURE 1 is a vertical sectional view showing an air filter for the engine of a motor vehicle;

FIGURE 2 is a vertical section taken on the line II—II of FIGURE 1;

FIGURE 3 is a detail sectional view, to an enlarged scale, showing one of the clips used on the filter of FIGURES 1 and 2;

FIGURE 4 is a detail plan view of the clip shown in FIGURE 3;

FIGURE 5 is a sectional view similar to FIGURE 2 but showing a filter having modified forms of clips for securing the cover to the body;

FIGURE 6 is a detail sectional view showing yet another form of connection between the cover and body;

FIGURE 7 is a detail sectional view, to a larger scale, taken on the line VII—VII of FIGURE 6;

FIGURE 8 is a detail view, partly cut-away and in section, showing yet another form of clip for securing the cover to the body;

FIGURE 9 is a view similar to FIGURE 5 but showing a modification.

Referring first to FIGURES 1 and 2, the filter shown comprises a casing having a body 1 and a removable cover 2. Although the body and cover could be made of sheet metal it is preferred and forms a useful feature of this invention that they should be made of a resin-bonded fibrous material. For this purpose it is preferred to use wood fibres in the form of a resin impregnated pulp, which is treated under heat and pressure in order to form a compressed fibre board. Other resin bonded fibrous materials are, however, also possible, including resin bonded glass fibres.

As will be clear from the drawings, the body 1 and cover 2 are both of extended flattened form and they provide a shallow filter casing the height of which between the bottom of the body and the top of the cover 2, which latter is shaped to provide an air inlet 3, as will be described, is substantially less than the length and width of the casing, as shown in FIGURES 1 and 2 respectively.

Fitted to the bottom of the body 1 is an air outlet 4, which may be made of metal or of a fibrous material similar to that used for the casing and which is adapted to be fitted and clamped to the air inlet of the engine. This connection is also designed to occupy very little vertical height.

The material of the cover 2 is shaped, as shown at 5, to provide a shallow, longitudinally-extending channel 6. The bottom of this is closed by means of a plate 7, except for an opening 8 which is left at the end remote from the air inlet 3. The plate 7 may be made of metal or of a fibrous material similar to the remainder of the casing and it is secured to the main part of the cover by riveting or other suitable means (not shown).

Fitted in the casing is a filter element, indicated generally at 9 which is constructed of one or more layers of fibres, for which purpose it is preferred to use synthetic fibres and more particularly fibres formed of a copolymer of a vinyl chloride with an acrylonitrile. An especially suitable material is one which is sold under the name "Dynel". The construction of such filter elements is described in U.S. patent application Ser. No. 256,616 filed Feb. 6, 1963, now U.S. Patent 3,229,818 and also in U.S. patent application Ser. No. 365,697, filed May 7, 1964.

The filter element 9 is shown as having an underneath layer 10 formed of an openwork material, such as scrim, the edges of which are secured to the edges of the fibrous layer or layers by means of a rim or beading 11, this rim or beading may be made of a resilient material, such as a synthetic plastic or a synthetic rubber, which may be cast or moulded in position, or it may be formed from the filter material itself, by softening and compressing the edges of the filter element in the manner described in the aforesaid U.S. patent application Ser. No. 365,697.

The body 1 is shaped to form a shallow channel 12 (see FIGURE 3) in which the beading 11 rests, while the cover 2 is provided with a flanged rim 13 which extends over the channel 12 and which also engages the beading 11. The beading is thus compressed between the body and the cover (space being left between the channel 12 and rim 13 for its deformation as shown in FIGURE 3) and it thus provides a fluid seal between the filter element 9 and both the body 1 and the cover 2.

The scrim or other layer 10, coupled with the fact that the edge beading 11 is held between the body 1 and cover 2 around the filter, may be sufficient to support the filter layer 9 above the bottom of the body, but if necessary additional means may be provided to assist in this. In FIGURES 1 and 2 these means are shown as comprising a number of ribbed metal or other strips 14, the ends of which are secured to the sides of the body, but other forms of support are possible. These include the provision of a sheet of perforated metal, metal gauze or other openwork material, which extends across the filter casing with its edges clamped between the beading 11 and the channel 12.

In the construction shown the cover 2 is provided, spaced along one of its longer edges with a number of downwardly-extending lugs 15 (FIGURE 2) which are adapted to hook under the channel 12 of the body 1 when the cover is fitted to the latter. The opposite edge of the cover is then secured to the body by means of one, two or more releasable clips (two generally being preferred) one of which is shown at 16 in FIGURES 2, 3 and 4.

Each such clips is formed of a length of resilient wire, the ends of which are pivotally engaged in a lug 17 secured to the body 2 and the central portion of which is bent as shown in order to form a pair of arcuate portions 18, which engage with a snap action in a channel 19 formed along the base of the rim 13 of the cover 2. The portion 2 of each clip 16 between the parts 18 is shaped so that it can be readily engaged by the fingers to release the clip.

FIGURE 5 shows the body 21 and cover 22 of a filter which is very similar to that shown in FIGURES 1 and 2, except for the provision of different means for securing the cover.

In this case the cover 22 is held in position by means of clips 23 which are arranged along both its longer edges, two pairs of such clips generally being preferred, each of these clips or each pair of clips, is formed of a length of resilient metal which is secured to the body 21 by means of a rivet or rivets 24 and the end or ends of which is or are shaped as shown in the drawings, so that each clip can be snapped into or out of engagement with the rim of the cover 22.

Referring now to FIGURES 6 and 7, these show part of a filter having a casing body 31 and cover 32, between which the edges of a filter element 33 are clamped. In this case the fibres 34 of the filter element are carried by a perforated metal sheet 35 the edges of which are turned over, as shown at 36, in order to clamp the edges of the fibrous layer 34. Furthermore, the parts 37 and 38 of the metal sheet 35 above and below the edges of the fibrous layers are stamped so as to form, in each, a pair of spaced openings 39, each of approximately triangular section, the metal from each pair of openings being bent upwardly or downwardly to form pairs of upwardly or downwardly extending sprags; these are indicated at 40 and 41. When assembling the filter these sprags are passed through holes formed in the body 31 and cover 32, which may be fitted with eyelets as indicated at 42 and 43, and are then bent over as shown in FIGURE 7. In this way the filter element 33 is secured to the body 31 and the cover 32 is secured both to the filter element and to the body.

FIGURE 8 shows a part of another filter comprising a body 51, cover 52 and filter element 53, the edges of which are secured together by means of a number of suitably spaced clips, one of which is shown at 54. Each such clip is formed of a length of resilient sheet metal or other material the upper and lower portions 55 and 56 of which are formed with dimples or projections 57 and 58. These are arranged to snap into eyelet holes 59 and 60 which are formed in the cover 51 and body 52 respectively.

FIGURE 9 shows a modified form of rim or beading 61 which offers certain advantages over the rim or beading 11 of FIGURE 3.

As shown in FIGURE 9, the body 1 of the filter casing is formed with generally flat edge 62 having a turned-down lip 63, in place of the channel 12 of FIGURE 3, while the rim or beading 61, which is provided on the filter element 9, is formed with a downwardly-turned flange 64 having an inwardly-projecting lip 65, which flange and lip engage round and beneath the lip 63 and edge 62 of the body 1. They thus hold the element 9 in position in the body 1, when the cover 2 is being fitted to or removed from the latter.

I claim:

An air filter for an internal combustion engine said filter comprising a shallow casing including a body having an air outlet adapted to be connected with the engine and a cover fitted over said body and including an air inlet for the admission of air to be filtered, said body and cover being provided with outwardly extending peripheral flanges, the cover flange overlying the body flange, the flange on said body being generally flat with a turned down lip, a flat filter element within said casing and extending across said casing; an annular thin peripheral projection integral with said filter element disposed between said flanges, means secured to said projection defining a resilient bead including a downwardly-turned flange having an inwardly-projecting lip, said flanges defining a channel to receive said bead, said filter element including a backing sheet carrying suitable filtering material and secured therewith by said bead, said bead being gripped between said flanges in said channel, said inwardly projecting lip engaging downwardly around and beneath the first mentioned lip to position said filter element over said body flange and to hold the filter element in place on the body during removal and replacement of the cover, and means clamping said flanges and bead together.

References Cited
UNITED STATES PATENTS

| | | | |
|---|---|---|---|
| 1,958,735 | 5/1934 | Worthington | 55—503 |
| 2,441,365 | 5/1948 | McAllister | 55—502 |
| 2,521,984 | 9/1950 | Lang | 55—514 |
| 2,563,242 | 8/1951 | Hexdall | 85—11 |
| 2,689,551 | 9/1954 | Heller et al. | 55—504 |
| 2,886,129 | 5/1959 | Streete | 55—276 |
| 2,888,095 | 5/1959 | Perrini et al. | |

(Other references on following page)

UNITED STATES PATENTS

| | | |
|---|---|---|
| 2,999,562 | 9/1961 | Lechtenberg. |
| 3,001,246 | 9/1961 | Mather. |
| 3,082,587 | 3/1963 | Brimberg _____ 210—495 |
| 3,091,487 | 5/1963 | Gallagher _____ 24—259 |
| 3,124,440 | 3/1964 | Hogg _____ 55—484 |
| 3,149,553 | 9/1964 | Solzman _____ 181—334 |
| 3,154,393 | 10/1964 | Klein et al. _____ 55—501 |

FOREIGN PATENTS

| | | |
|---|---|---|
| 1,324,694 | 3/1963 | France. |
| 681,811 | 10/1939 | Germany. |
| 1,097,282 | 1/1961 | Germany. |

HARRY B. THORNTON, *Primary Examiner.*

B. NOZICK, *Assistant Examiner.*